United States Patent

[11] 3,596,946

| [72] | Inventors | Charles A. Burton<br>Worthington;<br>Howard C. Davis, Columbus, both of, Ohio |
|---|---|---|
| [21] | Appl. No. | 17,514 |
| [22] | Filed | Mar. 9, 1970 |
| [45] | Patented | Aug. 3, 1971 |
| [73] | Assignee | The Wooster Brush Company<br>Wooster, Ohio |

[54] CAM LOCK FOR TELESCOPIC MEMBERS
9 Claims, 6 Drawing Figs.

| [52] | U.S. Cl. | 287/58 |
|---|---|---|
| [51] | Int. Cl. | F16b 7/10 |
| [50] | Field of Search | 287/58 CT, 58, 52.09; 285/394, 358; 248/188.5 |

[56] References Cited
UNITED STATES PATENTS

| 2,432,059 | 12/1947 | Zipser | 287/58 CT |
| 2,517,700 | 8/1950 | Odin | 287/58 CT |
| 2,526,415 | 10/1950 | Refsdal | 287/58 CT |
| 2,991,096 | 7/1961 | Davidson | 287/58 CT |
| 3,095,825 | 7/1963 | Sandberg et al. | 287/58 X |
| 3,419,293 | 12/1968 | Conrad | 287/58 |

*Primary Examiner*—Kenneth Downey
*Assistant Examiner*—Andrew V. Kundrat
*Attorney*—Oberlin, Maky, Donnelly and Renner ABSTRACT: Cam lock for telescoping members comprises a plug adapted to be partially received in one end of the inner telescoping member and having an outwardly projecting portion containing an eccentric groove for receipt of a correspondingly shaped eccentric collar or ring. Rotation of the collar within the groove is limited between an eccentric position frictionally engaging the outer telescoping member and a concentric position permitting relative movement between such telescoping members by a projection or stop in the plug groove extending into a slot in the collar to obtain unidirectional locking and unlocking of the outer telescoping member with respect to the inner telescopic member upon relative rotation of such members in opposite directions.

PATENTED AUG 3 1971
3,596,946
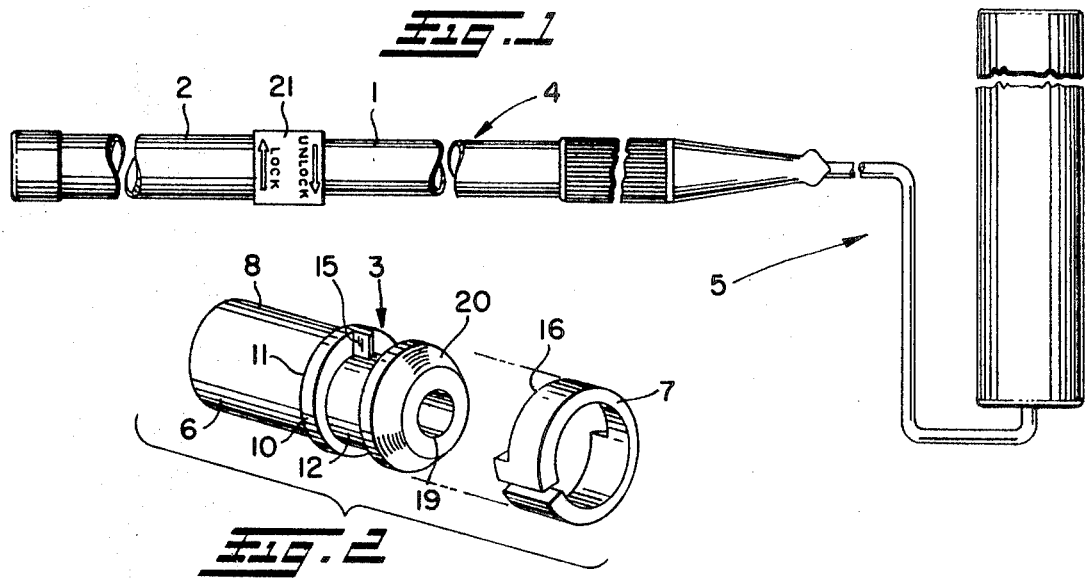
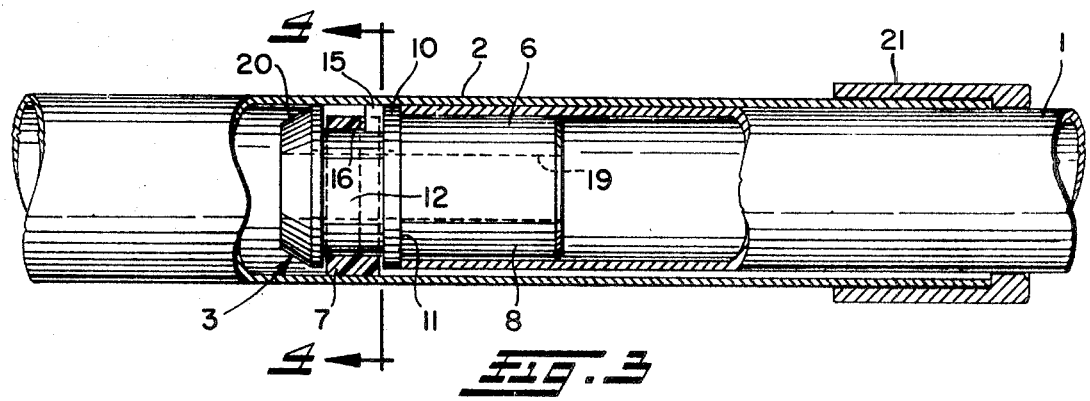
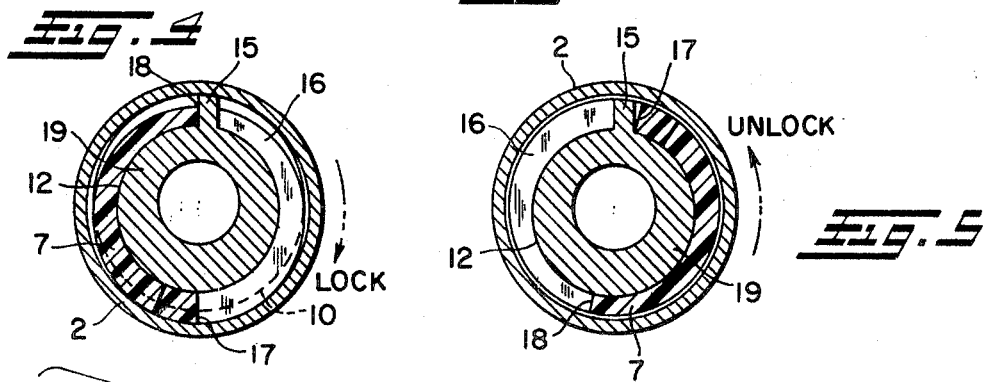
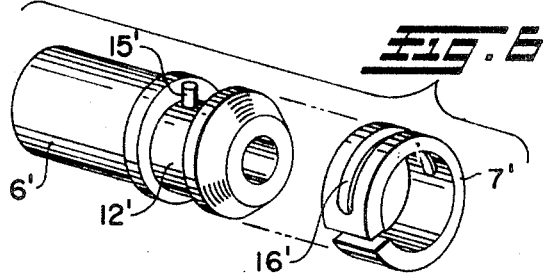
INVENTORS.
CHARLES A. BURTON
HOWARD C. DAVIS
Oberlin, Maky, Donnelly & Renner
ATTORNEYS

CAM LOCK FOR TELESCOPIC MEMBERS

BACKGROUND OF THE INVENTION

This invention relates generally as indicated to a cam lock for telescoping members, and more particularly to a unidirectional cam lock of simplified construction for use in releasably locking a pair of telescoping members in longitudinal adjusted position.

Cam locks have of course long been used for locking telescoping members in longitudinal adjusted position, and one of the most simple and inexpensive types of known cam locks consists of a plug inserted into one end of the inner member and having an eccentric groove in the projecting portion in which is received an eccentric collar. With the collar concentrically positioned in the groove, the telescoping members are free to be adjusted longitudinally with respect to each other. However, when the collar is rotated to an eccentric position relative to the plug, the plug and collar are both forced into frictional engagement with opposite sides of the outer member, thereby locking the members in longitudinal adjusted position.

A major drawback of this particular type of cam lock is that it is bidirectional and will lock the telescoping members together when the collar is rotated in either direction relative to the plug. This has the disadvantage that after locking the operator may not know in which direction to rotate the members to release the lock and oftentimes leads to confusion and wasted effort in further tightening the lock when trying to release the lock.

SUMMARY OF THE INVENTION

With the foregoing in mind, it is a principal object of this invention to provide a cam lock of the type generally described, but which has unidirectional characteristics to provide to the user a known direction for tightening and untightening of the lock.

Another object is to provide such a cam lock which permits positive locking of the telescopic members in adjusted position by relative rotation of such members in one direction and yet may readily be released by relative rotation of the members in the opposite direction for further longitudinal adjustment of the members, as desired.

Still another object is to provide such a cam lock which is of relatively low cost, desirably consisting of only two parts that may be easily and quickly assembled together.

These and other objects of the present invention may be achieved by providing the plug fur the cam lock with the usual eccentric groove for receipt of a similarly shaped eccentric collar, and a projection or stop in the eccentric groove which extends into a slot in the collar for limiting rotation of the collar within the groove between an eccentric position and a concentric position to achieve unidirectional locking and unlocking of the telescoping members upon relative rotation in opposite directions. A tapered end on the plug permits easy assembly of the collar onto the plug.

To the accomplishment of the foregoing and related ends, the invention, then, comprises the features hereinafter fully described and particularly pointed out in the claims, the following description and the annexed drawings setting forth in detail a certain illustrative embodiment of the invention, this being indicative, however, of but one of the various ways in which the principles of the invention may be employed.

BRIEF DESCRIPTION OF THE DRAWINGS

In the annexed drawings:

FIG. 1 is a fragmentary side elevation view showing a pair of telescoping members being used as a handle extension for a conventional paint roller and releasably retained in longitudinal adjusted position by a preferred form of cam lock constructed in accordance with this invention;

FIG. 2 is an enlarged exploded isometric view showing the various parts of the cam lock in disassembled condition;

FIG. 5 is an enlarged fragmentary longitudinal section through the telescoping members of FIG. 1 showing the cam lock therewithin;

FIGS. 4 and 5 are enlarged transverse sections through the cam lock of FIG. 3, FIG. 4 showing the cam lock in the locked condition with the collar eccentrically located on the plug forcing the collar and plug into tight frictional engagement with opposite sides of the outer telescoping member, locking the telescopic members in longitudinal adjusted position; and FIG. 5 showing the cam lock in the unlocked condition with the collar concentrically disposed with respect to the plug; and FIG. 6 is an enlarged exploded isometric view showing a modified form of cam lock in accordance with this invention in disassembled form.

DESCRIPTION OF THE PREFERRED EMBODIMENT

In FIGS. 1 and 3 there is shown a pair of telescoping members 1 and 2 which may be releasably locked in longitudinal adjusted position using a preferred form of cam lock 3 constructed in accordance with this invention. The telescoping members 1 and 2 are illustrated being used as a handle extension 4 for a paint roller 5, but it will be apparent that such telescoping members may be used for many other purposes as well.

As best seen in FIG. 2, the cam lock 3 desirably consists of two main parts, a cylindrically shaped plug 6 and a collar or ring 7. One end 8 of the plug 6 is of a diameter substantially equal to the inner diameter of the inner telescoping member 1 for insertion therein (see FIG. 3), where it is locked in place as by indenting the inner telescoping member 1 around the outer periphery thereof. The extent to which the plug 6 may be inserted into the inner telescoping member 1 may be limited by an enlarged cylindrical portion 10 on the outer projecting portion of the plug which provides a shoulder 11 for engagement by the end of the inner member 1. Preferably, the outer diameter of the enlarged cylindrical plug portion 10 is the same as the outer diameter of the inner telescoping member 1 thus to permit a close sliding fit of the outer telescoping member 2 over such enlarged cylindrical plug and inner telescoping member 1.

Formed in the outer periphery of the enlarged cylindrical plug portion 10 is an eccentric groove 12 adapted to receive the collar 7 which has an outer cylindrical surface and an eccentric opening therein providing a collar having a shape corresponding to the shape of the eccentric groove 12, for a purpose to be subsequently described. Projecting into the eccentric groove 12 from one side thereof is a projection or stop 15 which is received in a circumferentially extending end slot 16 formed in one end of the collar 7, whereby when the collar 7 and plug 6 are properly assembled, the extent of rotation of the collar 7 relative to the plug 6 is limited by engagement of the ends of the slot 16 with the stop. Alternatively, the circumferentially extending slot 16' may be intermediate the ends of the collar 7' and the projection or stop 15' may be a pin projecting into the slot from the bottom of the groove 12' as shown in FIG. 6. In any event the slot 16 desirably extends approximately 180° around the collar 7, and the projection 15 is located in such a position with respect to the slot 16 that when the collar 7 is rotated in a counterclockwise direction in the groove to bring one end 17 of the slot 16 into engagement with the projection 15 as shown in FIG. 5, the collar 7 is concentrically located on the plug 16 and will not interfere with longitudinal adjustment of the outer telescoping member 2 with respect to the inner telescoping member 1. However, when the collar 7 is rotated in the reverse or clockwise direction to bring the other end 18 of the slot 16 into engagement with the projection 15 as shown in FIG. 4, the collar is eccentrically disposed on the plug, thus causing the collar and plug to be forced into frictional engagement with opposite sides of the outer telescoping member 1 for locking both telescoping members in longitudinal adjusted position. A longitudinal bore 19 through the plug 6 permits free circulation of air between the telescoping members 1 and 2 so that air pressure does not build up within the outer member 2 during retraction of the outer member and a vacuum is not created therein during extension of the outer member relative to the inner member.

The collar 7 is made of a flexible material which may be of plastic such as nylon, and is split as shown to facilitate assembly of the collar onto the plug, and insure frictional sliding contact between the collar and inner diameter of the outer member 2 even when the collar is concentric on the plug. Accordingly, rotation of the outer member 2 relative to the inner member 1 will cause the collar 7 to rotate with the outer member unless there is engagement between one end of the notch in the collar and the projection 15 on the plug precluding further rotation of the collar in an unlocking direction or the collar is already in the eccentric locking position precluding further rotation of both the collar 7 and outer member in the locking direction. The forward end 20 of the plug 6 may be tapered as shown to provide a ramp for sliding of the collar up onto the enlarged cylindrical portion 10 and into the groove 12 during assembly.

To assist in guiding of the outer member 2 along the inner member 1 during longitudinal adjustment, an end cap 21 is provided on the telescoping end of the outer member which has a close sliding fit with the outer diameter of the inner member 1 as shown in FIG. 3. A suitable legend may also be provided on the end cap 21 or adjacent thereto as further shown in FIG. 1 indicating to the operator the directions of rotation of the outer member 2 relative to the inner member 1 which result in tightening and untightening of the telescopic members.

From the foregoing, it will not be apparent that the cam lock of the present invention is easily operated by relatively rotating the telescopic members in one direction or the other to obtain locking and unlocking of such members. The lock has unidirectional characteristics providing to the user known directions for always tightening and untightening the lock, thereby substantially eliminating the chances of inadvertent overtightening or loosening of the lock.

We claim:

1. A cam lock for a pair of inner and outer telescoping members comprising a plug projecting from one end of said inner telescoping member, an eccentric groove in the outer periphery of said projecting plug, an eccentric collar in said groove, said eccentric collar having a substantially completely annular outer cylindrical surface and an eccentric opening therein for receipt of said collar in said groove, a circumferentially extending slot in said collar, and a projection on said plug received in said slot in said collar for limiting rotation of said collar within said groove in opposite directions between a concentric position permitting longitudinal adjustment of said outer member with respect to said inner member and an eccentric position in which said collar and plug frictionally engage opposite sides of said outer member for locking said inner and outer members in longitudinal adjusted position.

2. The cam lock of claim 1 wherein said eccentric collar has a shape substantially corresponding to the shape of said groove.

3. The cam lock of claim 1 wherein said slot extends approximately 180° circumferentially of said collar thereby permitting rotation of said collar approximately 180° between such concentric and eccentric positions.

4. The cam lock of claim 1 wherein said circumferentially extending slot is formed in one end of said collar, and said projection extends into said slot from one side of said groove.

6. The cam lock of claim 1 wherein said collar is split and is made of a flexible material to facilitate assembly onto said plug and insure frictional sliding contact between said collar and the inner diameter of said outer member.

7. The cam lock of claim 6 further comprising a taper on the forward end of said plug which provides a ramp for sliding said collar up onto said plug and into said groove.

7. The cam lock of claim 1 wherein said slot is intermediate the ends of said collar, and said projection is a pin projecting into said slot from the bottom of said groove.

8. The cam lock of claim 1 further comprising a legend on said outer member adjacent the forward end thereof indicating the required direction for rotating said outer member relative to said inner member for locking and unlocking said inner and outer members in longitudinal adjusted position.

9. A cam lock for a pair of inner and outer telescoping members comprising a plug projecting from one end of said inner telescoping member, an eccentric groove in the outer periphery of said projecting plug, an eccentric collar in said groove, a slot in said collar, and a projection on said plug received in said slot for limiting rotation of said collar within said groove in opposite directions between a concentric position permitting longitudinal adjustment of said outer member with respect to said inner member and an eccentric position in which said collar and plug frictionally engage opposite sides of said outer member for locking said inner and outer members in longitudinal adjusted position, said slot extending approximately 180° in said collar thereby permitting rotation of said collar approximately 180° between such concentric and eccentric positions said slot being intermediate the ends of said collar, said projection being a pin projecting into said slot from the bottom of said groove.